(12) United States Patent
Alfke

(10) Patent No.: US 7,765,263 B1
(45) Date of Patent: Jul. 27, 2010

(54) METHOD AND APPARATUS FOR PROCESSING ELECTRONIC MESSAGES

(75) Inventor: Jens Peter Alfke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 755 days.

(21) Appl. No.: 10/741,948

(22) Filed: Dec. 19, 2003

(51) Int. Cl.
G06F 15/16 (2006.01)
(52) U.S. Cl. .................. 709/206; 709/205; 709/207
(58) Field of Classification Search .............. 709/205, 709/206, 207
See application file for complete search history.

(56) References Cited

U.S. PATENT DOCUMENTS

| | | | |
|---|---|---|---|
| 5,072,412 | A | 12/1991 | Henderson et al. |
| 5,617,539 | A | 4/1997 | Ludwig et al. |
| 5,854,893 | A | 12/1998 | Ludwig et al. |
| 5,880,731 | A | 3/1999 | Liles et al. |
| 5,896,500 | A | 4/1999 | Ludwig et al. |
| 6,121,533 | A | 9/2000 | Kay |
| 6,237,025 | B1 | 5/2001 | Ludwig et al. |
| 6,351,762 | B1 | 2/2002 | Ludwig et al. |
| 6,437,818 | B1 | 8/2002 | Ludwig et al. |
| 6,583,806 | B2 | 6/2003 | Ludwig et al. |
| 6,594,688 | B2 | 7/2003 | Ludwig et al. |
| 6,763,226 | B1 | 7/2004 | McZeal, Jr. |
| 7,152,093 | B2 | 12/2006 | Ludwig et al. |
| 7,164,423 | B1 | 1/2007 | Westen |
| 7,206,809 | B2 | 4/2007 | Ludwig et al. |
| 7,234,117 | B2 | 6/2007 | Zaner et al. |
| 7,421,470 | B2 | 9/2008 | Ludwig et al. |
| 7,433,921 | B2 | 10/2008 | Ludwig et al. |
| 2002/0152877 | A1 | 10/2002 | Kay |
| 2003/0016658 | A1* | 1/2003 | Creamer et al. ............ 370/352 |
| 2003/0135659 | A1 | 7/2003 | Bellotti et al. |
| 2004/0015610 | A1* | 1/2004 | Treadwell ................ 709/246 |
| 2004/0039630 | A1 | 2/2004 | Begole et al. |
| 2004/0078448 | A1 | 4/2004 | Malik et al. |
| 2004/0078596 | A1* | 4/2004 | Kent et al. ................ 713/201 |
| 2004/0128356 | A1* | 7/2004 | Bernstein et al. ........... 709/206 |
| 2004/0158610 | A1* | 8/2004 | Davis et al. ............... 709/206 |
| 2004/0158611 | A1* | 8/2004 | Daniell et al. ............. 709/206 |
| 2004/0172455 | A1* | 9/2004 | Green et al. ............... 709/207 |
| 2004/0186896 | A1* | 9/2004 | Daniell et al. ............. 709/207 |
| 2004/0215721 | A1* | 10/2004 | Szeto et al. ............... 709/204 |
| 2004/0254998 | A1 | 12/2004 | Horvitz |

(Continued)

OTHER PUBLICATIONS

Gordano Messaging Suite Data Sheet, Gordano Limited 1994-2003, pp. 1-6, North Somerset UK.

(Continued)

*Primary Examiner*—John Follansbee
*Assistant Examiner*—Nghi V Tran
(74) *Attorney, Agent, or Firm*—Blakely, Sokoloff, Taylor & Zafman LLP

(57) ABSTRACT

Methods and apparatuses for processing electronic messages are described herein. In one aspect of the invention, for an outgoing message addressed to a mail address of a recipient, the mail client determines whether is an alternative messaging system available to the mail address of the recipient. If there is an alternative messaging system available, the mail client determines whether the recipient's alternative messaging system is online. If so, the mail client sends the mail message to the recipient via the alternative messaging system. Otherwise, the mail client sends the message via normal mail system. Other methods and apparatuses are also described.

90 Claims, 9 Drawing Sheets

U.S. PATENT DOCUMENTS

| | | | |
|---|---|---|---|
| 2005/0080852 A1 | 4/2005 | Kelley et al. | |
| 2005/0080867 A1* | 4/2005 | Malik et al. | 709/207 |
| 2005/0094621 A1* | 5/2005 | Acharya et al. | 370/352 |
| 2007/0130259 A1* | 6/2007 | Daniell et al. | 709/204 |
| 2008/0098078 A1* | 4/2008 | Daniell | 709/206 |

OTHER PUBLICATIONS

Fastmobile.com. Fastmobile's fastchat Instant Communications Application is Coming to Thousands of Mobile Phone Retail Stores Nationswide. Sep. 2003.

Ljungstrand, Peter. Awareness of Presence, Instant Messaging and WebWho. SIGGSROUP Bulletin. Dec. 2000.

Venolia, Gina D. Understanding Sequence and Reply Relationships Within Email Conversations: A mixed-Model Visualization ACM Apr. 2003.

Liam Bannon, et al., "Evaluation and Analysis of Users' Activity Organization," CHI '83 Proceedings, Dec. 1983, pp. 54-57.

Peter C. S. Wong, et al., "Flair-User Interface Dialog Design Tool," Computer Graphics vol. 16, No. 3, Jul. 1982, pp. 87-98.

David R. Cheriton, "Man-Machine Interface Design for Timesharing Systems," University of Waterloo, Ontario, Canada, pp. 362-366.

Michael Good, "Etude and the Folklore of User Interface Design," Laboratory for Computer Science, Massachusetts Institute of Technology, Cambridge, Massachusetts, USA, ACM 1981, pp. 34-43.

D. Austin Henderson, Jr. et al., "Rooms: The User of Multiple Virtual Workspaces to Reduce Space Contention in a Window-Based Graphical User Interface," ACM Transactions on Graphics, vol. 5, No. 3, Jul. 1986, pp. 211-243.

Stuart K. Card, et al., "A Multiple Virtual-Workspace Interface to Support User Task—Switching," CHI + GI 1987, ACM, pp. 53-59.

Eugene Ball, et al., "A Test-Bed for User Interface Designs," Carnegie Mellon University, Pittsburgh, PA, USA, ACM 1981, pp. 85-88.

Warren Teitelman, "Ten Years of Window Systems- A Retrospective View," Methodology of Window Management, Proceedings of an Alvey Workshop at Cosener's House, Abingdon, UK, Apr. 1985. 13 pages.

Eve M. Schooler et al., "Multimedia Conferencing: Has It Come of Age?", Reprinted from the Proceedings $24^{th}$ Hawaii International Conference on System Sciences, vol. 3, pp. 707-716 (Jan. 1991) pp. 1-10.

Eve M. Schooler, "A Distributed Architecture for Multimedia Conference Control," ISI Research Report, Nov. 1991, University of Southern California Information Sciences Institute, Title page, pp. 1-18.

Eve M. Schooler, "The Connection Control Protocol: Architecture Overview," Version 1.0, USC/Information Sciences Institute, Jan. 1992, pp. 1-6.

Joseph D. Touch, "Zoned Analog Personal Teleconferencing (ZAPT)," USC/Information Sciences Institute, pp. 1-19.

Eve M. Schooler, "Case Study: Multimedia Conference Control in a Packet-Switched Teleconferencing System", USC/Information Sciences Institute, pp. 1-17.

Terrence Crowley, et al., "MMConf: An Infrastructure for Building Shared Multimedia Applications" CSCW '90 Proceedings, Oct. 1990, pp. 329-342.

Harry Forsdick, "Explorations into Real-time Multimedia Conferencing," Computer Message Systems—85, IFIP, 1986, pp. 331-347.

Robert W. Root, "Design of a Multi-Media Vehicle for Social Browsing," Bell Communications Research, Morristown, NJ, USA, ACM 1988, pp. 25-38.

S.R. Ahuja et al., "A Comparison of Application Sharing Mechanism in Real-Time Desktop Conferencing Systems," AT&T Bell Laboratories, Holmdel, NJ, USA, ACM 1990, pp. 238-248.

Hiroshi Ishi, "TeamWorkStation: Towards a Seamless Shared Workspace," NTT Human Interface Laboratories, Japan, CSCW '90 Proceedings, Oct. 1990, pp. 13-26.

Thomas Kaeppner et al., Architecture of HeiPhone: A Testbed for Audio/Video Teleconferencing, IBM European Networking Center, Heidelberg, pp. 1-17.

Kankanahalli Srinivas et al., "MONET: A Multi-media System for Conferencing and Application Sharing in Distributed Systems," CERC Technical Report Series Research Note, Feb. 1992, 10 pages (2-sided).

* cited by examiner

METHOD AND APPARATUS FOR PROCESSING ELECTRONIC MESSAGES

FIELD OF THE INVENTION

The present invention relates generally to data processing. More particularly, this invention relates to electronic message processing.

BACKGROUND OF THE INVENTION

In computer network systems such as local-area networks ("LANs"), wide-area networks ("WANs"), and the Internet and the worldwide web ("WWW") which operates thereon, email systems and associated protocols are often utilized to facilitate communication between two users of the network or email system. Each user has a unique network address which may be used for routing and identifying purposes in delivering an email message from one user (the "sender") to another user (the "recipient") on the network.

Email messages are typically sent from a sender to a recipient by the sender typing or otherwise preparing an email message on a PC (personal computer), which is itself typically coupled to a server coupled to a communications network such as the Internet. The email contains both a body or content portion, which contains the message itself, and the network email address(es) of the recipient(s). Email messages can also include more complex information such as attached files. In general, however, each email transmission from a sender to a recipient over a network includes some body or message portion and the network addresses of the sender and recipient. The email transmission may be referred to, in general, as an email message, which is transmitted via a network from a sender to a recipient.

The email message is thus transmitted from the sender PC to the local network router or server (e.g., an email server), which delivers the email message in packetized form to the network. The packets are each routed from one node of the network to another, in accordance with the recipient address information associated with the packets. These packets are received by a recipient server of the network, which can then assemble the received packets into the original email message and deliver the email message to the recipient's PC, which is attached to the recipient server. The email message may be routed through one or more routing servers between the sender's server and the recipient's server. These routing servers may be different types of servers provided by different vendors. The routing servers may queue and schedule the routing the email message according to its own schedule. As a result, the delivery of the email message may be delayed by the routing servers and such delays are sometimes unacceptable. In addition, such delay prevents the recipient from providing the sender an instant confirmation of arrival of the email message at the recipient, even if the sender enables a return receipt option on the outgoing email message.

For many users, the send and receive email server functions are performed by a service provider such as an Internet service provider (ISP). In order to receive email, a user must first "log in" to his ISP, typically by use of a modem and telephone line or other communications channel such as a cable system cable. Any email messages which have been received by the ISP for the user since the last time the user logged in to his ISP may then be delivered to the user-recipient. If the user keeps his PC continually logged on to his ISP and is present at his PC, he can receive email as soon as it is received by his ISP. The user's own PC may be configured to alert the user when it receives the email message from the ISP. However, many users log in only periodically to check for email messages. Thus, if an important email message arrives while the user is not logged in or is away from his PC terminal, the user will not be aware of this.

SUMMARY OF THE DESCRIPTION

Methods and apparatuses for processing electronic messages are described herein. In one aspect of an exemplary embodiment of the invention, for an outgoing message addressed to a mail address (e.g., an Internet email address) of a recipient, the mail client of a sender determines whether there is an alternative messaging system (e.g., an instant messaging system or a chat system) available to the mail address of the recipient. If there is an alternative messaging system available, the mail client determines whether the recipient's alternative messaging system is online. If so, the mail client sends the mail message to the recipient via the alternative messaging system. Otherwise, the mail client sends the message via a normal mail system.

In one aspect of an exemplary embodiment of the invention, when an incoming message is received at an alternative messaging system of a recipient, such as an instant messaging (IM) client, the message is examined whether the message is a mail message. If it is determined that the message is a mail message, the message is then forwarded to the corresponding mail client of the recipient and displayed as an ordinary mail message as if it is received from the corresponding mail server.

According to yet another aspect of an exemplary embodiment of the invention, when a mail client is launched, it registers with an alternative messaging client, such as an IM client. The alternative messaging client then advertises in its associated community that it is capable of processing mail messages.

According to yet another aspect of an exemplary embodiment of the invention, an alternative messaging server, such as an IM server, receives a message from a first messaging client of a first user, which is sent by a first mail client of the first user. The first mail client is communicatively coupled to the first messaging client of the first user. In response to the message, the alternative messaging server substantially instantly sends the message to a second messaging client of a second user, which is communicatively coupled to a second mail client of the second user. The message is then forwarded from the second messaging client to the second mail client and the second mail client processes the message as an ordinary mail message as if it is received from the first mail client of the first user via a mail server.

The present invention also discloses machine readable media which may be executed by a processor to perform the above processes. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
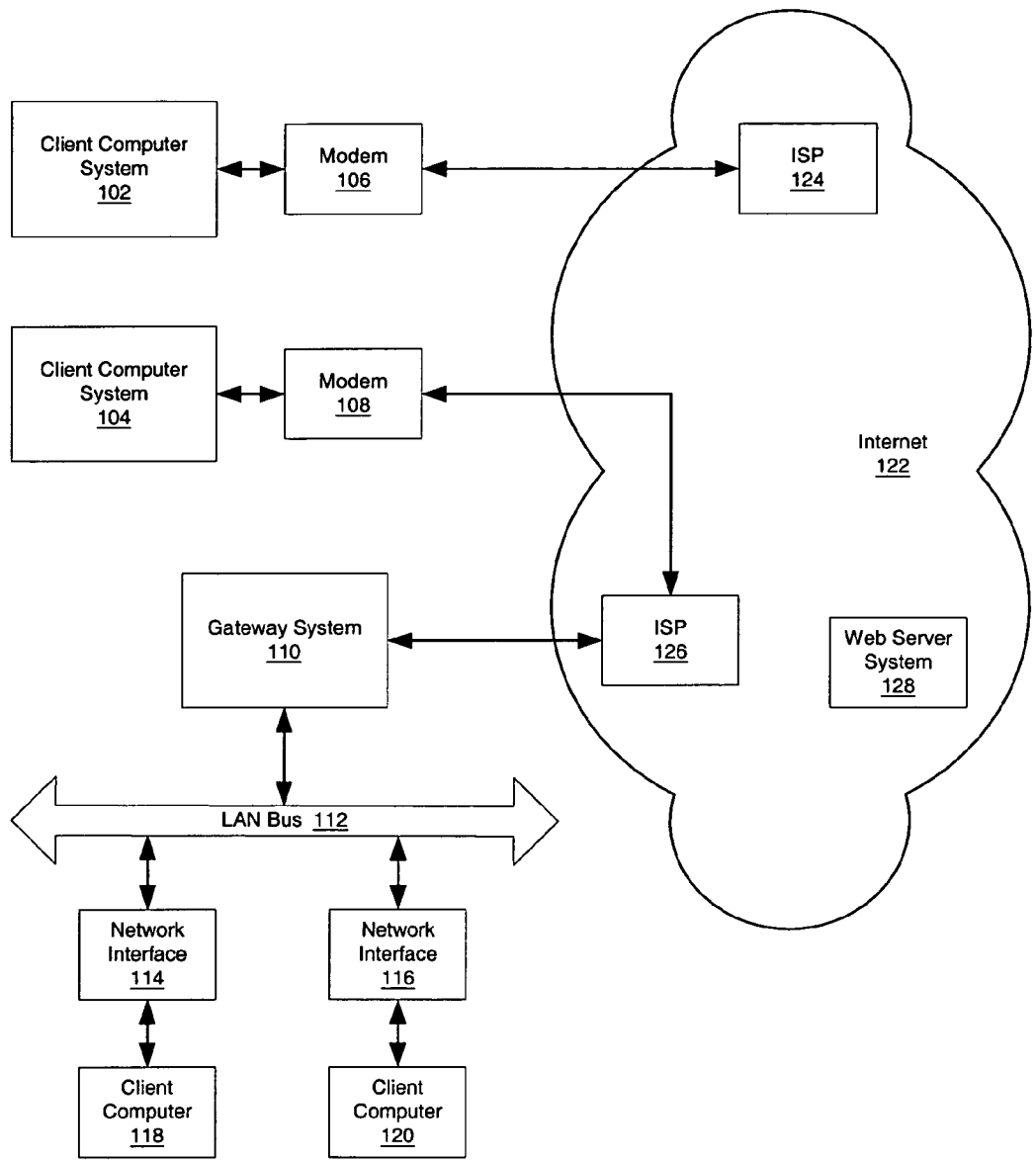
FIG. 1 is a block diagram of a network of computer systems in which electronic messages may be processed, according to one embodiment of the invention.

Method and apparatus for processing electronic messages are described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a diagram of a network of computer systems in which an email may be processed via an alternative message delivery system other than an email system, according to one embodiment of the present invention. As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. It will be also appreciated that such system may be implemented in an Intranet within an organization.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126. Access to the Internet may facilitate transfer of information (e.g., email, text files, media files, etc.) between two or more digital processing systems, such as the client computer systems 102, 104, 118, and 120 and/or a Web server system 128. For example, one or more of the client computer systems 102, 104, 118, and 120 and/or the Web server 128 may provide document presentations (e.g., a Web page) to another one or more of the client computer systems 102, 104, 118, and 120 and/or Web server 128. For example, in one embodiment of the invention, one or more client computer systems 102, 104, 118, and 120 may request to access a document that may be stored at a remote location, such as the Web server 128. In the case of remote storage, the data may be transferred as a file (e.g., download) and then displayed (e.g., in a window of a browser) after transferring the file. In another embodiment, the document presentation may be stored locally at the client computer systems 102, 104, 118, and/or 120. In the case of local storage, the client system may retrieve and display the document via an application, such as a word processing application. Without requiring a network connection.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML document (e.g., Web pages), which may be provided by the Web server 128.

The ISP 124 provides Internet connectivity to the client computer system 102 via a modem interface 106, which may be considered as part of the client computer system 102. The client computer systems 102, 104, 118, and 120 may be a conventional data processing system, such as a Power Mac G5 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system. The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

Client computers 102, 104, 118, and 120 may be able to send and receive email messages from each other. The email systems used by client computers 102, 104, 118, and 120 may be proprietary email systems, such as IBM Lotus Notes. Alternatively, the email systems used by the client computers may be standard email systems, such as email systems using POP3 (post office protocol), SMTP (simple mail transport protocol), or IMAP (Internet message access protocol) protocols. According to one embodiment, the email client running at the client computers 102, 104, 118, and 120 may determine whether there is an alternative message delivery mechanism, such as, for example, instant messaging (IM) system, to deliver the email message quicker. If the sender's email client determines that there is an alternative (e.g., a better alternative) available, the email client may interact with an application of the alternative delivery mechanism. The alternative delivery mechanism may deliver the email message to the recipient via the alternative delivery system, instead of going through the normal email server which routes the email message (via one or more routing servers) to the recipient's email server, and thereafter, the recipient's email server forwards the message to the recipient.

According to another embodiment, the alternative delivery mechanism, such as an IM system, may be able to detect whether the counterpart application of the recipient is enabled (e.g., online). The email client of the sender may interrogate the alternative delivery system to determine the status of the recipient's counterpart and its capability. The email client of the sender may only transmit the email message to the alternative delivery system if the alternative delivery system of the recipient is active (e.g., online) and able to receive such email messages. Otherwise, the email client of the sender may delivery the email message through a normal email server.

According to one embodiment, in order to distinguish the email message from other messages delivered by the alternative delivery system, the email message may be tagged with an identification indicating the message being delivered is an email message and repackaged in a format compatible with the message requirement of the alternative delivery system. On the other side, when a recipient's counterpart alternative delivery system (e.g., IM client) receives the message, the message may be examined (via the tagged identification) to determine whether the message is an email message. If the message is an email message, the recipient's counterpart may reroute the message to the email client of the recipient. In one embodiment, either the alternative delivery system or the email client repackages the message as an ordinary email message and the email client displays the message as if it is received from the corresponding email server. Such actions are performed transparently to a user of the recipient and the user does not know whether the email message may be received via the alternative delivery system.

Figure 2A:
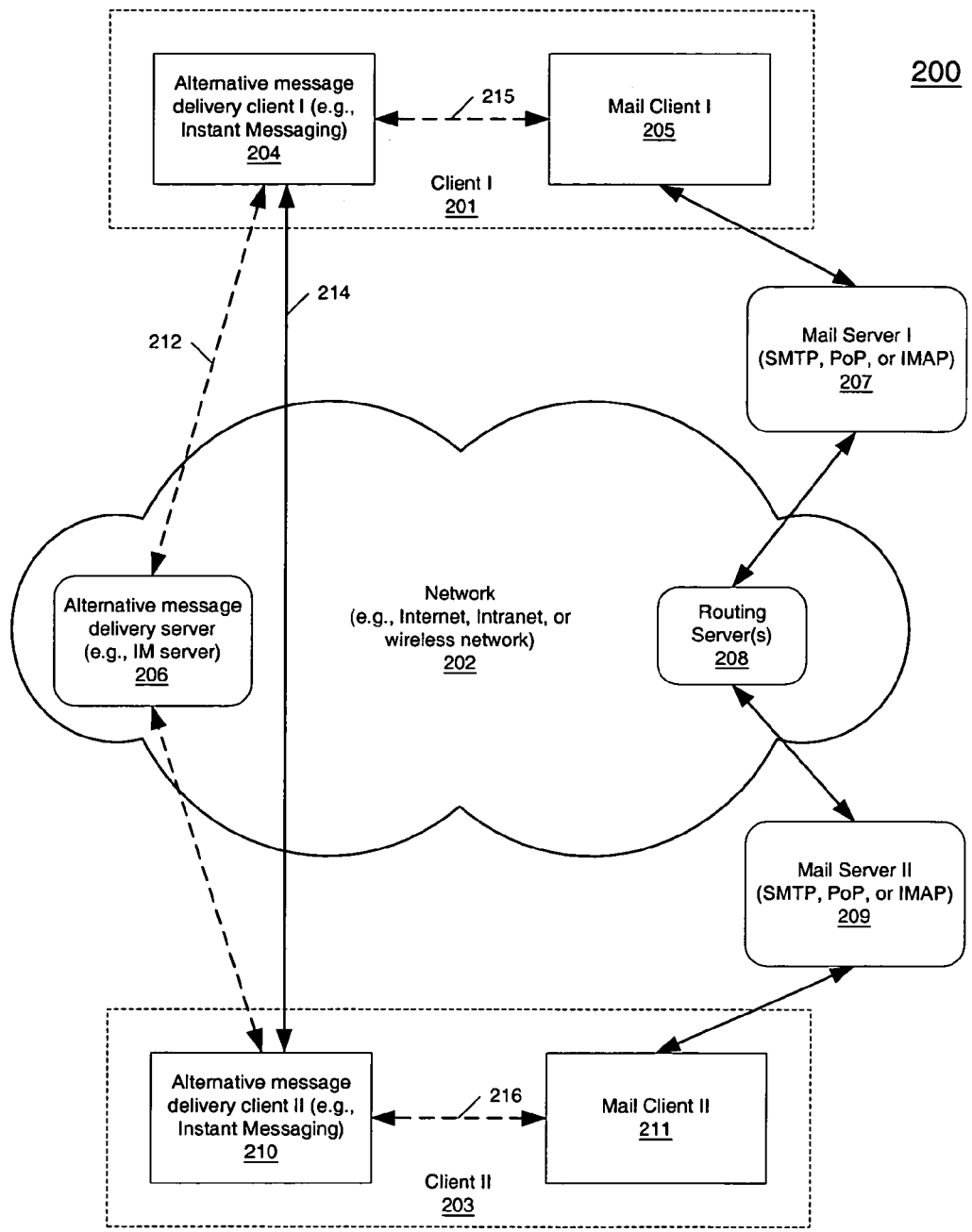
FIG. 2A is a block diagram illustrating an exemplary system for processing electronic messages, according to one embodiment of the invention.

FIG. 2A is a block diagram of an exemplary message processing system according to one embodiment of the invention. In one embodiment, exemplary system 200 includes clients 201 and 203 communicating with each other over a network 202. Network 202 may be an Internet, an Intranet, or a wireless network. Typically, client 201 may communicate with client 203 via an email system including mail clients 205 and 211, mail servers 207 and 209, and one or more routing servers 208 within the network 202. Mail servers 207 and 209 may use mail protocols, such as POP3, SMTP, or IMAP protocols, to process mail messages. A typical mail server may include an SMTP server for handling outgoing mail messages and a POP3 server for handling incoming mail messages. Alternatively, mail servers 207 and 209 may be proprietary mail servers provided by the same or different vendors. IM clients 204 and 210 may communicate with each other using a variety of communication protocols, such as, for example, proprietary protocols or the instant messaging and presence protocol proposed by the IETF (Internet Engineering Task Force).

In addition, clients 201 and 203 may be separately and independently running an alternatively message delivery system, such as, for example, an instant messaging (IM) system. In our fast-paced world, sometimes even the rapid response of email is not fast enough. A user has no way of knowing if the person the user is sending email to is online at that particular moment or not. Also, the email sending through the network may be delayed by one or more routing servers. As a result, more and more alternative message delivery systems, such as instant messaging, are getting more popular. A typical IM system may include IM clients 204 and 210 running at client 201 and 203 respectively. IM clients 204 and 210 may communicate with IM server 206 shared with IM clients 204 and 210.

Instant messaging allows a user to maintain a list of people that the user wishes to interact with. A user may send messages to any of the people in the list, also referred to as a buddy list or contact list, as long as that person is online. Sending a message opens up a small window where the user and its friend can type in messages that both can see. Most of the popular instant messaging programs, such as AOL's AIM, or IM from Yahoo, provide a variety of features, such as swapping instant messages, chat, Web links, images, sounds, and files, and others (e.g., talk and streaming content). After the initial registration with the IM server 206 through paths 212 and 213, IM server 206 allows the message to be transmitted to the intended recipient without having the message queued or delayed by a local mail server, as typically required by the conventional mail delivery mechanism. In addition, some IM systems allow IM clients 204 and 210 to directly communicate with each other (through path 214) without involving IM server 206, using in part of the respective IP address and a port assigned to the IM services. As a result, messages exchanged between clients 204 and 210 are delivered in a faster manner.

According to one embodiment, IM clients 204 and 210 may interact with mail clients 205 and 211 respectively, such that mail messages of mail clients 205 and 211 may be delivered or received via the IM clients 204 and 210 utilizing the advanced features of the IM system, which will be described in details further below. In one embodiment, when mail client 205 is launched and initialized, mail client 205 may register, via path 215, with IM client 204 to enable mail client 205 to transmit and receive mail messages via IM client 204. After mail client 205 has registered with IM client 204, IM client 204 may broadcast or advertise, via IM server 206, in the IM community that IM client 204 is capable of handling mail messages. Other members of the IM community, such as IM client 210, receives such advertisement and may sends further mail messages to IM client 204 subsequently.

Similarly, when mail client 211 is launched and initialized, mail client 211 may register, via path 216, with IM client 210 to enable mail client 211 to transmit and receive mail messages via IM client 210. After mail client 211 has registered with IM client 210, IM client 211 may also broadcast or advertise, via IM server 206, in the IM community that IM client 210 is capable of handling mail messages (e.g., the IM client 210 is "online"). Thereafter, mail clients 205 and 211 may exchange mail messages via IM clients 204 and 210 respectively.

For example, according to one embodiment, when mail client 205 receives a mail message from a user addressed to mail client 211 of a recipient, mail client 205 determines, without involving corresponding mail server 207, whether there is an alternative messaging system, such as IM client 204, available. The determination may be performed based on whether mail client 205 has registered with IM client 204 successfully. If there is no alternative messaging system available, mail client 205 may fall back to its mail server 207 to handle the incoming and outgoing mail messages. In one embodiment, such determination may be performed based on whether the alternative messaging system is installed or whether mail client 205 fails to register with the alternative messaging system, such as IM client 204, using one of the aforementioned techniques.

If it is determined that there is an alternative messaging system available, according to one embodiment, mail client 205 may, via alternative messaging client 204 (e.g., IM client), determine whether the recipient's alternative messaging counterpart, such as alternative messaging client 210 (e.g., IM client), is activated (e.g., online). If the recipient's alternative messaging client is not activated (e.g., offline), mail client 205 may fall back to its mail server 207 to handle the mail messages.

If it is determined that the recipient's alternative messaging counterpart is activated, mail client 205 may determine, via alternative messaging system 204, whether the recipient alternative messaging counterpart (e.g., alternative messaging system 210) is capable of handling mail messages. The determination may be performed based on whether the recipient's mail client 211 has successfully registered with its alternative messaging system 210, which advertises such capability in the associated community, using one of the aforementioned techniques. If it is determined that the recipient's alternative messaging counterpart is unable to handle mail messages, mail client 205 may fall back to its mail server 207 to handle the mail messages.

If the recipient's alternative messaging system is able to handle mail messages, according to one embodiment, mail client 205 may optionally tag an identification with the mail message to indicate that the message being sent is a mail message. Alternatively, according to another embodiment, the tagging may be performed by alternative messaging client 204. Thereafter, mail client 205 transmits the mail message to alternative messaging client 204 where the mail message may be repackaged in a format compatible with the alternative messaging system (e.g., an IM message packet). Alternatively, the mail message may be repackaged by mail client 205. Furthermore, if the message is routed by the alternative messaging server 206, the message may be repackaged by the server 206. The mail message is then sent to the recipient's alternative messaging counterpart 210 over network 202, directly via path 214 or indirectly via server 206.

When the recipient's alternative messaging system, such as IM client 210 receives the message transmitted through either indirectly through server 206 or directly through path 214, according to one embodiment, IM client 210 examines the message packets to determine whether the message is an email message. In one embodiment, IM client 210 may examine the identification tagged with the message to determine whether the message is an email message. If the message is determined to be an ordinary IM message, the message is displayed in a display of the IM client 210.

If the message is determined to be an email message (or a message for other applications), the IM client 210 may reroute the message to corresponding mail client 211. The message received, which may be IM packets, may be repackaged as email messages by mail client 211 and displayed in a display, such as an Inbox, of mail client 211 as if it is received from the corresponding mail server 209. Alternatively, the repackaging may be performed by IM client 210. Such actions are performed transparently to a user of client 203. That is, the user of client 203 does not know whether the message displayed may be transmitted over through an alternative messaging system. Once IM client 210 turns over the message to mail client 211 successfully, IM client 210 may return a success status to IM client 204 of the sender. As a result, client 201 (e.g., the sender) may substantial instantly receive a confirmation of an arrival of the message at client 203.

In addition, when IM client 210 receives the message, IM client 210 may determine whether mail client 211 is running and optionally has logged onto the corresponding server 209. If IM client 210 determines that mail client 211 is not running, IM client 210 may return a failure status to IM client 204 of sender 201. In which case, client 201 may fall back to mail client 205 to resend the message to mail server 207 which forwards the message to mail server 209 of the recipient. Alternatively, if IM client 210 determines that mail client 211 is not running, IM client 210 may attempt to launch mail client 211 and optionally prompt the corresponding user to log in. Furthermore, if IM client 210 determines that mail client 211 is not running, IM client 210 may simply store the message at a storage (e.g., a hard drive) of the recipient 203. The stored message may be retrieved and displayed when the user launches his or her email client 211. Further, IM client 210 may just display a dialog box at a desktop of recipient 203 indicating a new message has arrived, without involving mail client 211. The above options may be configurable through a user interface of recipient 203, such as user preference settings. Other configurations may exist.

In one embodiment, IM clients 204 and mail client 205 may operate independently to each other (e.g., separate applications). That is, client 201 having IM client 204 and mail client 205 installed may not be related to IM server 206. Alternatively, IM clients 204 and mail client 205 may be implemented within the same application or a plugged-in application with respect to each other. Furthermore, the mail system (e.g., mail client 205 and mail server 207) of client 201 may be a different mail system with respect to the mail system (e.g., mail client 211 and mail server 209) of client 203.

Note that the above techniques are not limited to a mail system with an IM system. It will be appreciated that other applications capable of interacting with another application may register with an IM system to transmit and receive data with another application via the IM system. It will be appreciated that the alternative messaging system may not be limited to an IM system, any messaging system may utilize the above described techniques to provide an alternative message routing system to an application capable of communicating with another application, such as an electronic organizer or a Web service application, etc.

Furthermore, clients 201 and 203 are described only for the purposes of a sender or a recipient. Alternative messaging delivery client 204 and mail client 205 are controlled by client 201. However, alternative messaging delivery client 204 and mail client 205 are not limited to be within the same platform. According to one embodiment of the invention, alternative messaging delivery client 204 and mail client 205 may be located at different and separate platforms communicating with each other and controlled by client 201 (e.g., a sender or a recipient). Similarly, alternative messaging delivery client 210 and mail client 211 may be located at different and separate platforms communicating with each other and controlled by client 203 (e.g., a sender or a recipient), as illustrated in FIG. 2B.

Figure 2B:
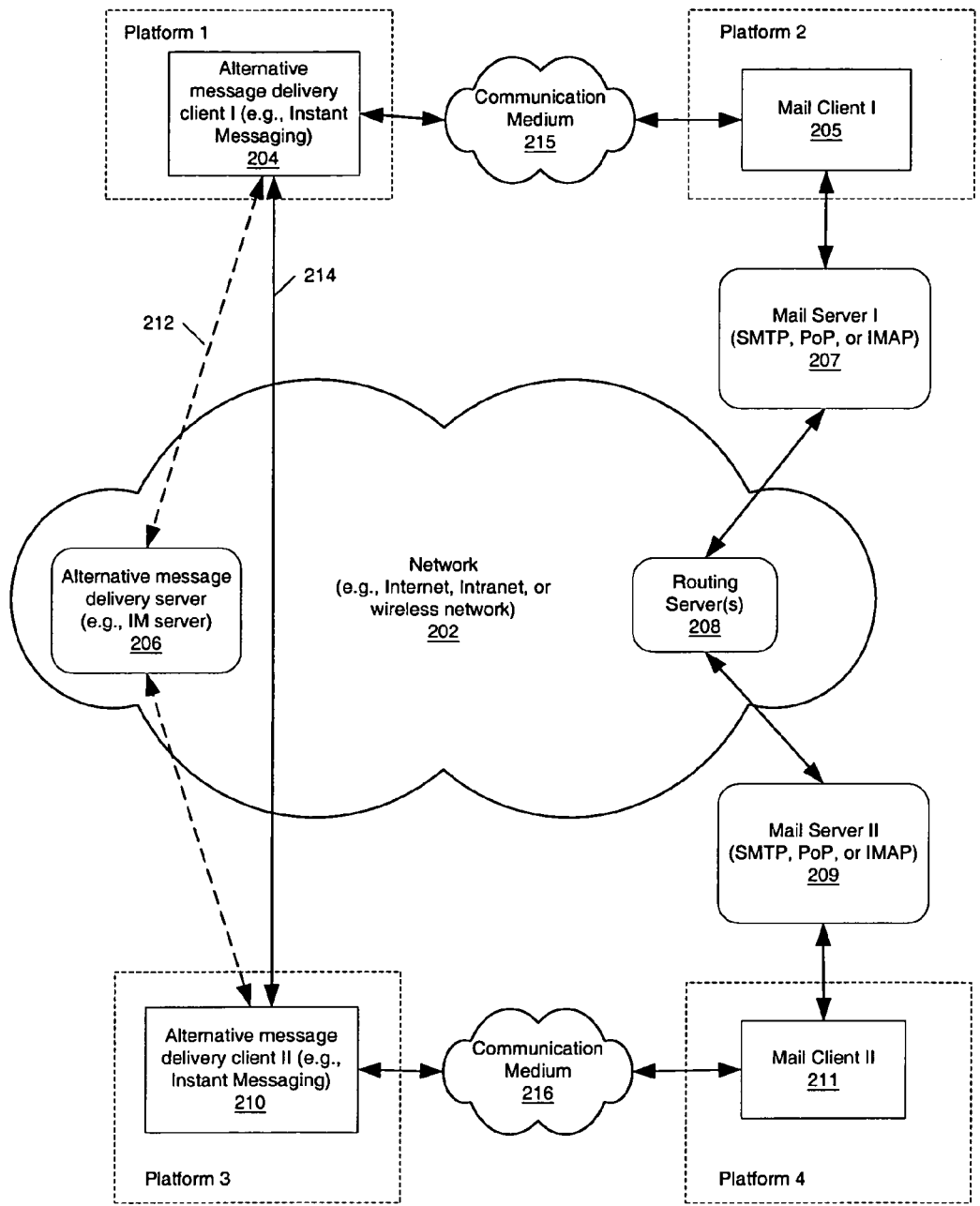
FIG. 2B is a block diagram illustrating an exemplary system for processing electronic messages, according to an alternative embodiment of the invention.

FIG. 2B is a block diagram illustrating an exemplary message processing system according to an alternative embodiment of the invention. Referring to FIG. 2B, alternatively message delivery client 204 and mail client 205 are located within different platforms (e.g., platform 1 and 2) respectively. Platforms 1 and 2 are controlled by a sender or a recipient. Similarly, alternatively message delivery client 210 and mail client 211 are located within different platforms (e.g., platform 3 and 4) respectively. Platforms 3 and 4 are controlled by a sender or a recipient. Alternatively message delivery clients 204 and 210 and mail clients 205 and 211 communicate with each other via communication mediums 215 and 216 respectively. Communication mediums 215 and 216 may be a wired communication medium, such as, for example, a local network area (LAN) connection or a modem connection. Alternatively, communication medium 215 may be a wireless connection, such as, for example, an infrared or a home networking connection (e.g., IEEE 802.xx, such as Bluetooth or WiFi).

For example, platform 1 may represent a desktop computer having a network interface to network 202 while platform 2 may be a handheld device, such as, a cellular phone, a Palm pilot, a two-way pager, or an email platform (e.g., a Black-Berry platform from Research In Motion of Waterloo, ON), etc. When a sender represented by platforms 1 and 2 desires to send a mail message to a recipient represented by platforms 3 and 4, mail client 205 communicates with alternative message delivery client 204 to determine whether alternative message delivery client 204 is available and able to handle mail message via communication medium 215. If alternative message delivery client 204 is available and able to handle mail message, mail client 205 transmits the mail message from platform 2 to platform 1 via communication medium 215. Alternative message delivery client 204 then sends the mail message via the associated messaging system to the corresponding alternative message delivery client 210 of platform 3, which is controlled by the recipient. Thereafter, alternative message delivery client 210 of platform 3 forwards the received message to mail client 211 of platform 4, which is also controlled by the recipient, using one of the aforementioned techniques.

Figure 2C:
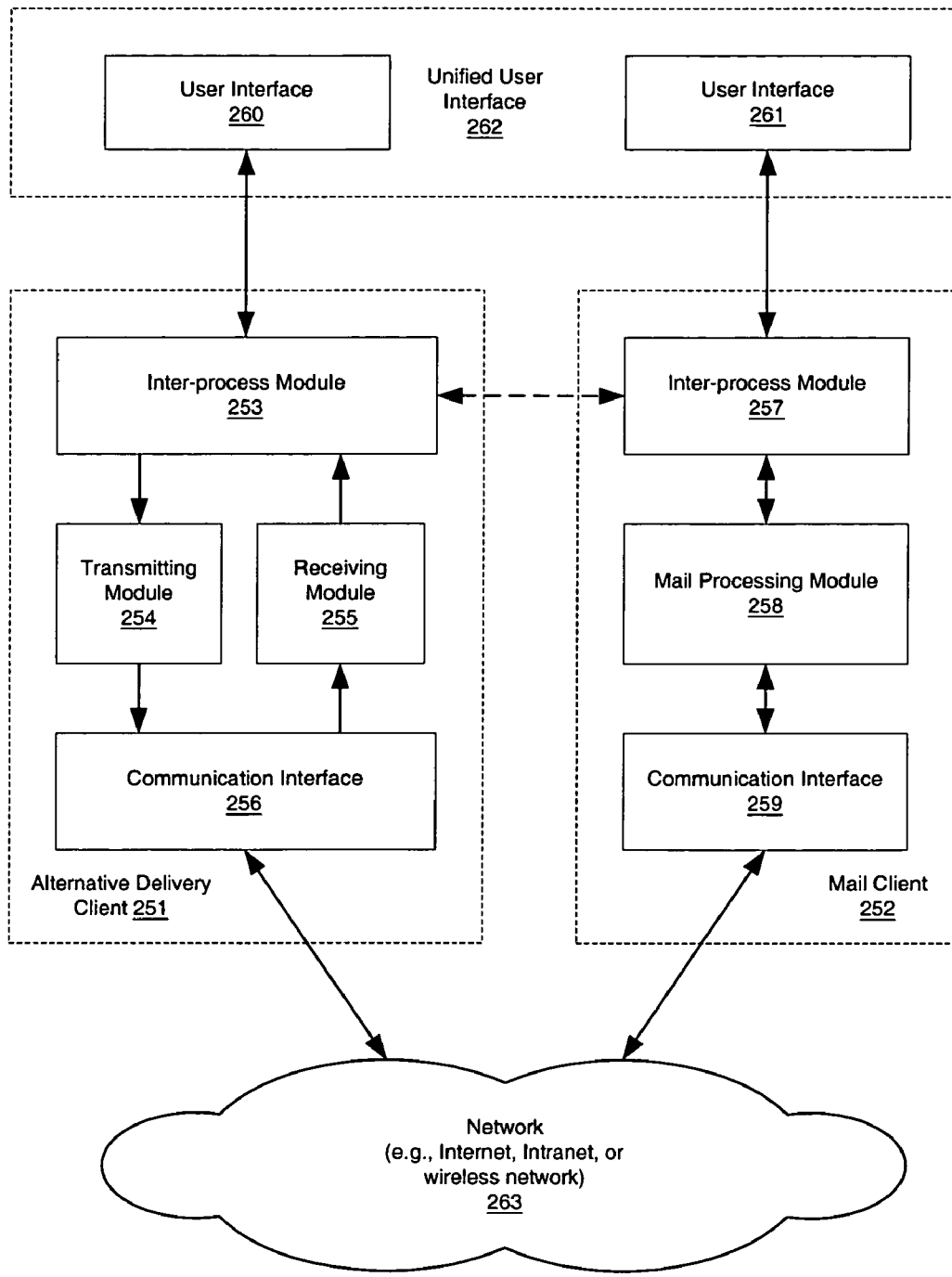
FIG. 2C is a block diagram illustrating an exemplary mail client and an alternative delivery client according to one embodiment of the invention.

FIG. 2C is a block diagram illustrating an exemplary client having a mail client and an alternative delivery client communicatively coupled to each other according to one embodiment of the invention. The exemplary client 250 may represent clients 201 and 203 of FIG. 2A. In one embodiment, exemplary client 250 includes a mail client 252 communicatively coupled to an alternative delivery client 251. Similar to a conventional mail client, mail client 252 includes a user interface 261, a mail processing module 258, and a communication interface 259. User interface 257 may include an inbox to display incoming messages and an editor to allow a user to prepare an outgoing message. Mail processing module may communicate with a mail server (not shown) via communication interface 252 to transport and to receive outgoing and incoming messages. In addition, according to one embodiment, mail client further includes an inter-process module 257 that is able to communicate with another application, such as, for example, an IM client or an electronic organizer, etc.

In one embodiment, alternative delivery client 251 includes a user interface 260, an inter-process module 253, a transmitting module 254, a receiving module 255, and a communication interface 256. Transmitting module 254 is responsible for transmitting an outgoing message in accordance with a communication protocol to a destination via communication interface 256 and network 263. Receiving module 255 is responsible for receiving an incoming message from an originator via communication interface 256 and network 263. User interface 260 may include a display window to display an incoming message and an editor to allow a user to prepare an outgoing message. Inter-process module 253 is responsible for handling traffic between user interface 260 and transmitting module 254 and receiving module 255. In addition, inter-process module further handles communication between client 251 and mail client 252.

User interfaces 260 and 261 may be separate user interfaces for handling different messages respectively. According to one embodiment, user interfaces 260 and 261 may be integrated as a unified user interface 262 to handle both mail messages and non-mail messages. For example, unified user interface 262 may include a window as an inbox to display both incoming mail messages and other non-mail messages, such as IM messages. Alternatively, alternative delivery user interface 260 may be a stand-alone user interface, while mail client 252 includes unified user interface 262 that includes the alternative delivery user interface 260. Further detailed information concerning the unified user interface can be found in a co-pending U.S. patent application Ser. No. 10/741,660, by Stephen O. Lemay et al., having an applicant's reference of 4860.P3077, entitled "Unified User Interface for Instant Messaging and Email", filed Dec. 19, 2003, and assigned to a common assignee of the present application. The above-identified U.S. patent application is hereby incorporated by reference.

According to one embodiment, when mail client 252 is launched, inter-process module 257 may determine whether an alternative delivery mechanism is available. In one embodiment, the alternative delivery mechanisms, including the associated recipient's addresses, may be listed within an address book of mail client 252. If an alternative delivery mechanism is available, mail client 252 may register with the alternative delivery client 251 to inform alternative delivery client 251 that mail client 252 is up and running. If alternative delivery client 251 is not running or active, mail client 252 may optionally launch alternative delivery client 251 and register with alternative delivery client 251 thereafter. Once the mail client 252 and the alternative delivery client 251 have established a connection, the alternative delivery client 251 may advertise in its respective community that it can handle messages associated with the mail client 252.

In one embodiment, when a sender prepares an outgoing message using user interface 261, user interface 261 transmits the outgoing message to inter-process module 257. Inter-process module 257 determines whether client 250 has an alternative delivery mechanism. In one embodiment, an alternative delivery mechanism may be identified through a lookup operation in an address book associated with mail client 252. If inter-process module 257 determines that an alternative delivery mechanism exists, inter-process module 257 may communicate with the associated alternative delivery client 251 via the previously established inter-process connection. Alternatively, inter-process module 257 may dynamically launch the alternative delivery client 251 and establish such an inter-process connection.

If the alternative delivery client 251 is up and running, inter-process module 257 of mail client 252 may interrogate with alternative delivery client 251 via respective inter-process module 253 to determine whether an intended recipient's corresponding alternative delivery mechanism is online and whether the intended recipient's alternative delivery mechanism is capable of receiving a mail message (e.g., whether it is able to redirect an incoming message to a mail client of the recipient). If it is determined that the recipient's alternative delivery mechanism is online and capable of handling mail massages, inter-process module 257 transmits the outgoing mail message to the alternative delivery client 251. Otherwise, inter-process module 257 transmits the outgoing mail message to mail processing module 258 and the mail processing module 258 processes the outgoing mail message as an ordinary mail message.

When inter-process module 253 of the alternative delivery client 251 receives the outgoing mail message received from mail client 252, according to one embodiment, inter-process module 253 transmits the message to transmitting module 254. Transmitting module 254 then delivers the message to the intended recipient via communication interface 256 and network 263, as if the message is an ordinary message associated with the alternative delivery client 251. In addition, inter-process module 253 or the transmitting module 254 may repackage the mail message into a message compatible with a communication protocol associated with the alternative delivery mechanism. Furthermore, inter-process module 253 may further tag the message to indicate that the message is a mail message before transmitting the message to transmitting module 254. Alternatively, the tagging and repackaging may be performed by the mail client 252.

For the purposes of illustration, it is assumed that client 250 is now representing a recipient to receive a mail message transmitted via an alternative delivery mechanism from a sender. According to one embodiment, the message is received by receiving module 255 via communication interface 256. The receiving module 255 transmits the message to inter-process module 253. The inter-process module 253 may examine the message to determine whether the message is a mail message by, for example, examining the identification or signature tagged by the sender. If the message is determined to be a mail message, inter-process module 253 may transmits the message to inter-process module of mail client 252 via a inter-process connection. Otherwise, inter-process module 253 may transmit the message to the corresponding user interface 260 and user interface 260 displays the message as an ordinary message associated with the alternative delivery client 251.

When inter-process module 257 of mail client 252 receives the message from the alternative delivery client 251, inter-process module 257 transmits the message to the corresponding user interface 261 where the message is displayed as an ordinary mail message. The above operations may be performed transparently to a user of mail client 252. In addition, inter-process module 257 may further perform repackaging the message into a mail message, as well as other operations, such as, for example, stripping off the tagged identification, before transmitting the message to user interface 261. The repackaging or the like operations may be performed by the alternative delivery client 251, such as inter-process module 253 or receiving module 255.

Furthermore, if user interfaces 260 and 261 are implemented as unified user interface 262, the message may be directly delivered to the unified user interface 262 by inter-process module 253, where the unified user interface 262 may examine the message (e.g., examining the tagged identification) and display the message accordingly. Other operations apparent to those with ordinary skill in the art may be performed.

As described above, client 250 may represent a sender or a recipient. Alternative delivery client 251 and mail client 252 are not required to be in the same platform. It will be appreciated that alternative delivery client 251 and mail client 252 may be located within different platforms controlled by a sender or a recipient, as illustrated in FIG. 2B. Other configurations may exist.

Figure 3:
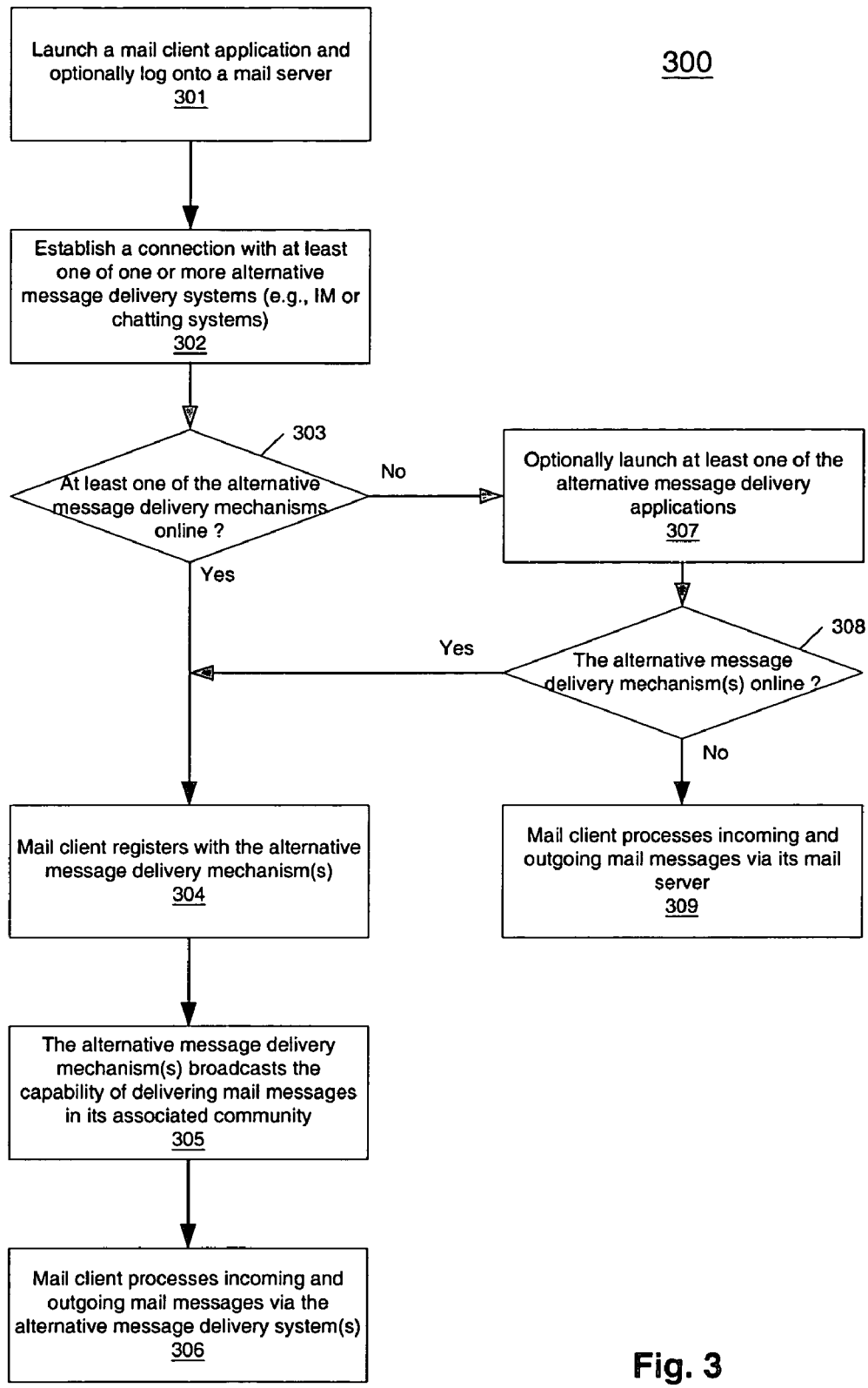
FIG. 3 is a flow diagram illustrating an exemplary process for processing electronic messages, according to one embodiment of the invention.

FIG. 3 is a flow diagram illustrating an exemplary process for registering a mail client with an alternative message delivery system, according to one embodiment of the invention. Exemplary process 300 may be performed by a processing logic that may comprise hardware (circuitry, dedicated logic, etc.), software (such as is run on a general purpose computer system or a dedicated machine), or a combination of both. In one embodiment, exemplary process 300 includes launching an application of a client, the application capable of transmitting and receiving data with another application, determining whether the client has an instant messaging (IM) capability, and registering with the client's IM capability, such that the application is able to transmit and receive data, via the client's IM capability, with another application over a network.

Referring to FIG. 3, at block 301, when a mail client, such as mail client 205, is launched and optionally logs into a mail server (e.g., mail server 207), at block 302, the mail client tries to establish a connection with at least one of one or more alternative message delivery systems, such as IM system having IM client 204 and IM server 206. If the respective alternatively message delivery system is not activated (block 303), at block 307, mail client may optionally launch an application associated with the alternative messaging system. If the alternative message application cannot be launched (block 308), at block 309, the mail client may fall back to the mail server to handle the incoming and outgoing mail messages.

Once the alternative messaging system is activated, at block 304, the mail client may register with the alternative messaging system. After the mail client has registered with the alternative message system, at block 305, the alternative message client may broadcast or advertise its capability to handle mail messages to a community associated with the alternative messaging system, such as IM messaging community. Thereafter, at block 306, the mail client may process incoming and outgoing mail messages via the registered alternative messaging system. Other operations apparent to one with ordinary skill in the art may be included.

Figure 4:
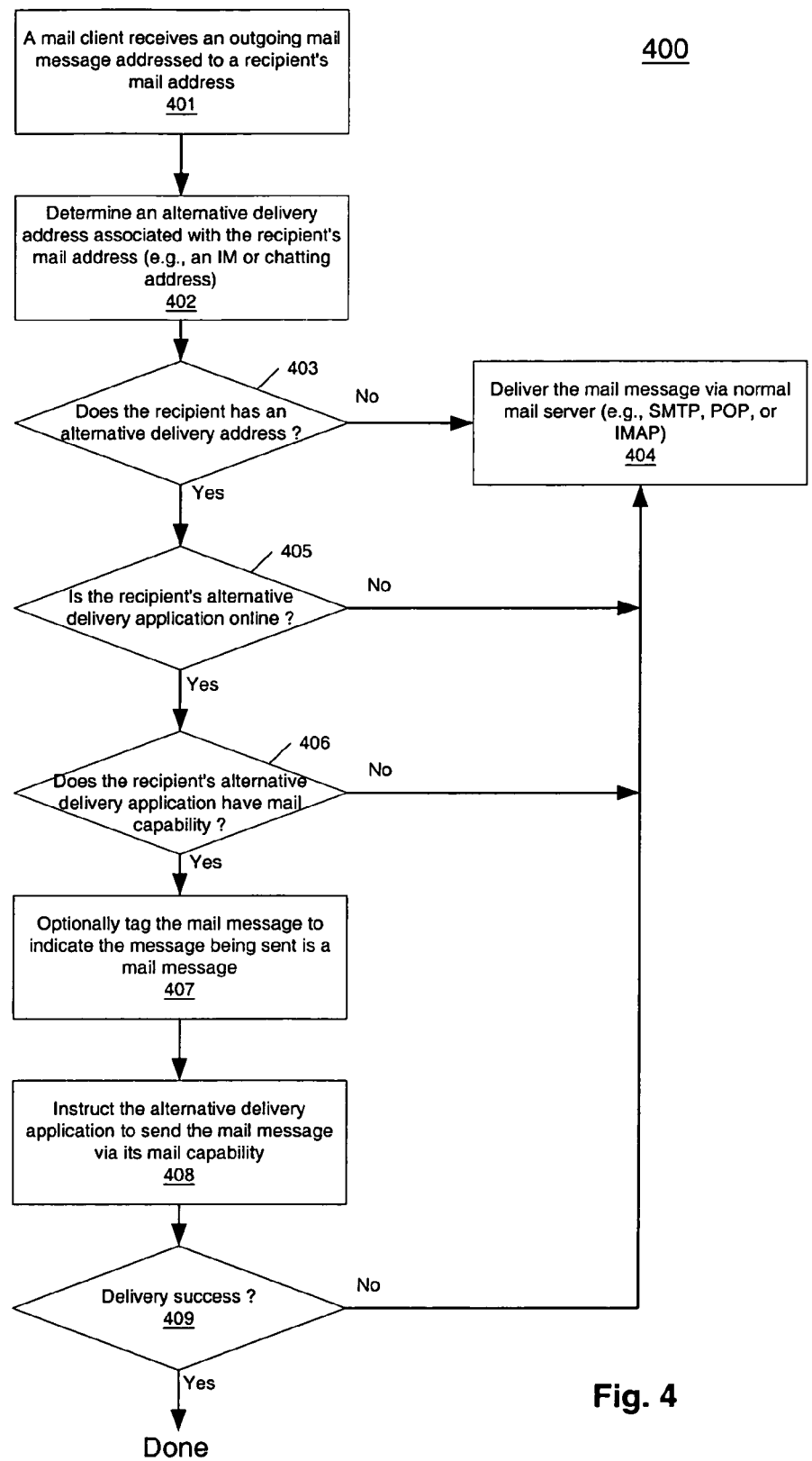
FIG. 4 is a flow diagram illustrating an exemplary process for processing electronic messages, according to another embodiment of the invention.

FIG. 4 is a flow diagram illustrating an exemplary process for delivering an electronic message according to one embodiment of the invention. Exemplary process 400 may be performed by a processing logic that may comprise hardware (circuitry, dedicated logic, etc.), software (such as is run on a general purpose computer system or a dedicated machine), or a combination of both. In one embodiment, exemplary process 400 includes receiving, at a mail client, a mail message addressed to a mail address of a recipient at a remote site, determining, at the mail client, whether there is an alternative delivery mechanism available for the recipient, delivering the mail message to the recipient via the alternative delivery mechanism, if the alternative delivery mechanism is available, and delivering the mail message to a mail server which forwards the mail message to the recipient, if the alternative delivery mechanism is unavailable.

Referring to FIG. 4, when a mail client (e.g., mail client 205) receives an outgoing mail message addressed to a mail address of a recipient (block 401), at block 402, the mail client determines whether there is an alternative messaging system (e.g., IM client 204) available for the mail address of the recipient. In one embodiment, the mail client determines the alternative delivery address (e.g., IM address) of the recipient based on the mail address of the recipient. The mail client may look up in a database, such as an address book of the sender (e.g., client 201) to search for an alternative address (e.g., IM address) associated with the mail address of the recipient. If there is no alternative messaging system available (block 403), at block 404, the mail client delivers the message to a corresponding mail server (e.g., mail server 207), which forwards the message to the recipient via an ordinary mail system.

If there is an alternative messaging system available for the mail address of the recipient, at block 405, mail client or the alternative messaging client may determine whether the recipient's alternative messaging system is online (e.g., whether the recipient IM client is running). If the recipient's alternative messaging system is not running, the mail client may fall back to the mail server to process the mail message (block 404).

If the recipient's alternative messaging system is online (e.g., the IM client 210 is running), at block 406, the mail client or the alternative messaging client may determine whether the recipient's alternative messaging client can handle mail messages. In one embodiment, the determination may be performed based on whether the recipient's mail client has registered with its alternative messaging client and the alternative messaging client has advertised such capability in the associated community. If the recipient's alternative messaging client does not have such capability, the mail client may fall back to the mail server to process the mail message (block 404).

If the recipient's alternative messaging system has a capability to handle mail messages, at block 407, the message may be tagged with an identification to indicate that the message is an email message rather than an ordinary message associated with the alternative messaging system. In addition, according to one embodiment, the message may be repackaged as or converted to a message conforming to a protocol of the alternative messaging system before being transmitted over by the alternative messaging system at block 408.

At block 409, the mail client may examine the return status received from the alternative messaging system to determine whether the delivery is successfully. If the delivery is unsuccessful, the mail client may fall back to the mail server to process the mail message again (block 404). Other operations apparent to one with ordinary skill in the art may be included.

Figure 5:
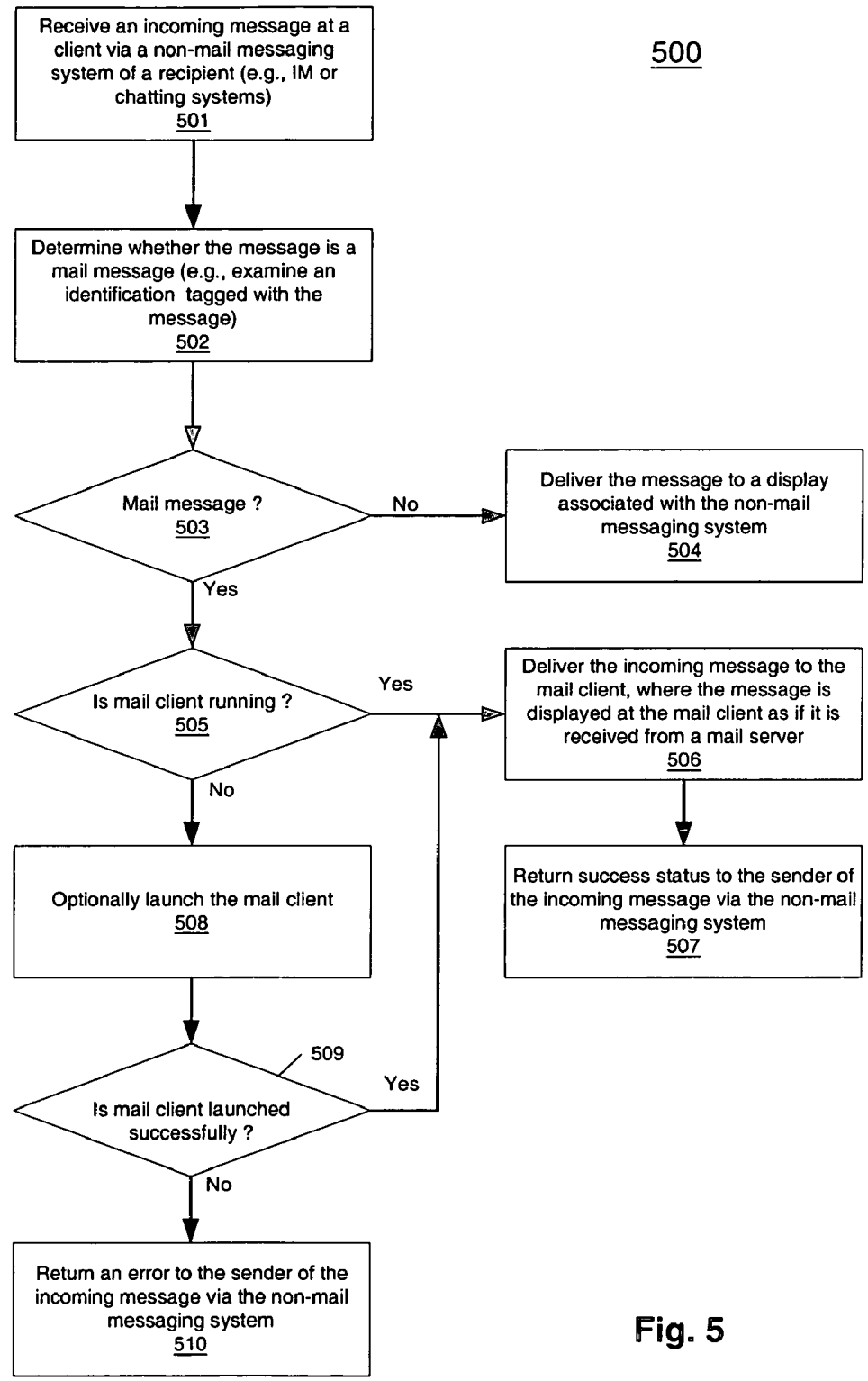
FIG. 5 is a flow diagram illustrating an exemplary process for processing electronic messages, according to yet another embodiment of the invention.

FIG. 5 is a block diagram illustrating an exemplary process for handling incoming electronic message according to one embodiment of the invention. Exemplary process 500 may be performed by a processing logic that may comprise hardware (circuitry, dedicated logic, etc.), software (such as is run on a general purpose computer system or a dedicated machine), or a combination of both. In one embodiment, exemplary process 500 includes receiving a message at an instant messaging (IM) client from an originator over a network, the message received designated to an application communicably coupled to the IM client, determining, at the IM client, which application the message is designated to, and delivering the message to the designated application via an application programming interface (API).

Referring to FIG. 5, when an incoming message is received at a client via a non-mail messaging system of a recipient (block 501), such as an IM system, at block 502, the non-mail messaging client determines whether the message is a mail message. In one embodiment, the determination is performed based on whether the incoming message is tagged with an identification indicating the message as a mail message. If the message is not a mail message (block 503), the message is delivered and displayed at a display of the non-mail messaging client at block 504 (e.g., the message is delivered in an instant messaging user interface).

If the message is determined to be a mail message, at block 505, the non-mail messaging client determines whether the mail client of the recipient is running. If the corresponding mail client is running, at block 506, the message is forwarded to the mail client and displayed at the mail client as if it is received through a mail system. In one embodiment, the message may be optionally repackaged as a mail message prior to being displayed at the mail client. Such operations are performed transparently to a user of the mail client. Thereafter, at block 507, the mail client may return a success status to the sender via the non-mail messaging system. As a result, the sender may substantially instantly receive a confirmation of arrival of the message at the recipient.

If the corresponding mail client is not running (block 505), at block 508, the non-mail messaging client may optionally attempt to launch the mail client. If the mail client is successfully launched (block 509), the message is then forwarded to the mail client to be displayed as a mail message at block 506 and thereafter return a success status to the sender at block 507. Otherwise, at block 510, a failure status is returned. Other operations apparent to one with ordinary skill in the art may be included.

According to one embodiment, exemplary system 200 of FIG. 2A is not limited to rerouting an email message via an alternative messaging system. It will be appreciated that the techniques may be applied to other applications capable of receiving data from a remote application. For example, a user with a mobile device may use exemplary system 200 to update his or her calendar or to schedule a meeting with someone. A traditional approach may rely on email system to perform such action. In a traditional approach, a user typical sends an email to a server (e.g., an email server or an electronic organizer) to update the calendar. Since the email system typically goes through one or more routing servers and may cause delay, the update may cause conflicts with other events, which the user has no way to know instantly. However, according to one embodiment, a user may use exemplary system 200 to send a message or a command to update his or her calendar through a better alternative messaging system, such as IM system. The message or command may be sent to the corresponding targeted application quicker and substantial instantly receive a confirmation of an arrival of the message or command. As a result, the user may instantly know whether the message has been received by the recipient and whether a conflict exists.

Figure 6:
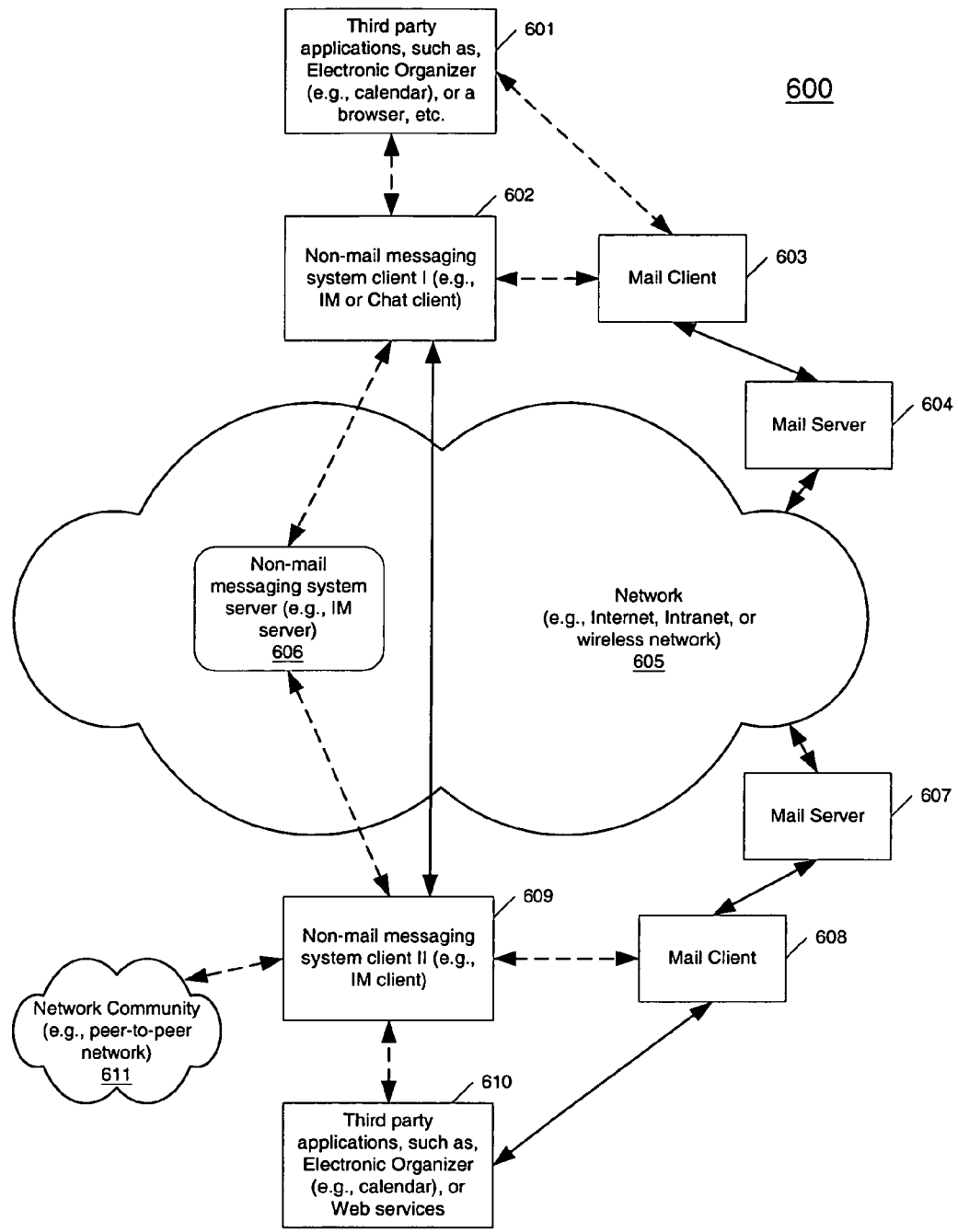
FIG. 6 is a block diagram illustrating an exemplary system for processing electronic messages, according to another embodiment of the invention.

FIG. 6 is a block diagram illustrating an exemplary message processing system according to one embodiment of the invention. In this embodiment, third party applications 601 and 610 may utilize exemplary system 600 to send and receive messages or commands via an alternative messaging system (non-mail clients 602 and 609 and server 606) other than a mail system (mail clients 603 and 608, and mail servers 604 and 607, as well as the routing servers in between). According to one embodiment, third party application 601, such as an electronic organizer, may use mail client 603 or non-mail client (e.g., IM client) 602 to update a recipient's counter part application 610. Application 601 may perform the determination whether an alternative messaging system 602, other than mail system 603, is available, using techniques similar to those described above. Alternatively, application 601 may send and receive message through mail client 603 and mail client 603 performs such determination using one of the aforementioned techniques.

In addition, a local community network 611, such as a peer-to-peer network may be coupled to the non-mail messaging client or the mail client, such that a message being sent or received may be processed by at least one of the peers in the community 611.

Furthermore, the non-mail messaging system is not limited to a traditional IM system available to a wired network. It will be appreciated that other types of network, such as a wireless network (e.g., a cellular network or a home networking environment, such as an IEEE 802.xx network), may utilize the techniques described above. For example, network 605 may include a cellular network and application 601 may be an application running at a portable PDA (personal digital assistant) or a cellular phone capable of sending or receiving mail messages. In addition, application 601 may also be capable of receiving wireless instant messages, such as SMS (short message service) messages available in a cellular network to substantial instantly transmit a message to a recipient's counterpart, which forwards the message to its mail client and displays the message as a mail message in an Inbox of the recipient's mail. Other configurations apparent to one with ordinary skill in the art may exist.

According to one embodiment, more than one alternative delivery mechanisms, such as, for example, IM, wireless SMS (short message services), two-way paging system, or facsimile application, etc., may be available for the sender to select. The mail client may select from the multiple alternative delivery mechanisms a most appropriate delivery mechanism to deliver the mail message. In one embodiment, the mail client may select the most appropriate delivery mechanism based on an attribute of the mail message, the user configuration, or the user preferences. For example, the mail client may select the IM or cellular SMS services to deliver the message if it is determined that the message needs to be delivered in the fastest manner. Alternatively, the mail client may select a facsimile service to deliver the message if it is determined that the message needs to be sent in the most secure manner. The recipient's addresses or the fax numbers of the alternative delivery mechanisms may be stored in an address book of the sender. The mail client may perform a lookup operation in the address book to discover the multiple alternative delivery mechanisms. The mail client may interrogate the respective system to determine whether the recipient's counterpart application is online and has the capability to handle the message that is about to send.

As described above, non-mail messaging system client 609, mail client 608, and third party applications 610 are not required to be within the same platform. It will be appreciated that non-mail messaging system client 609, mail client 608, and third party applications 610 may be located within different platforms controlled by a sender or a recipient, as illustrated in FIG. 2B. Other configurations may exist.

Figure 7:
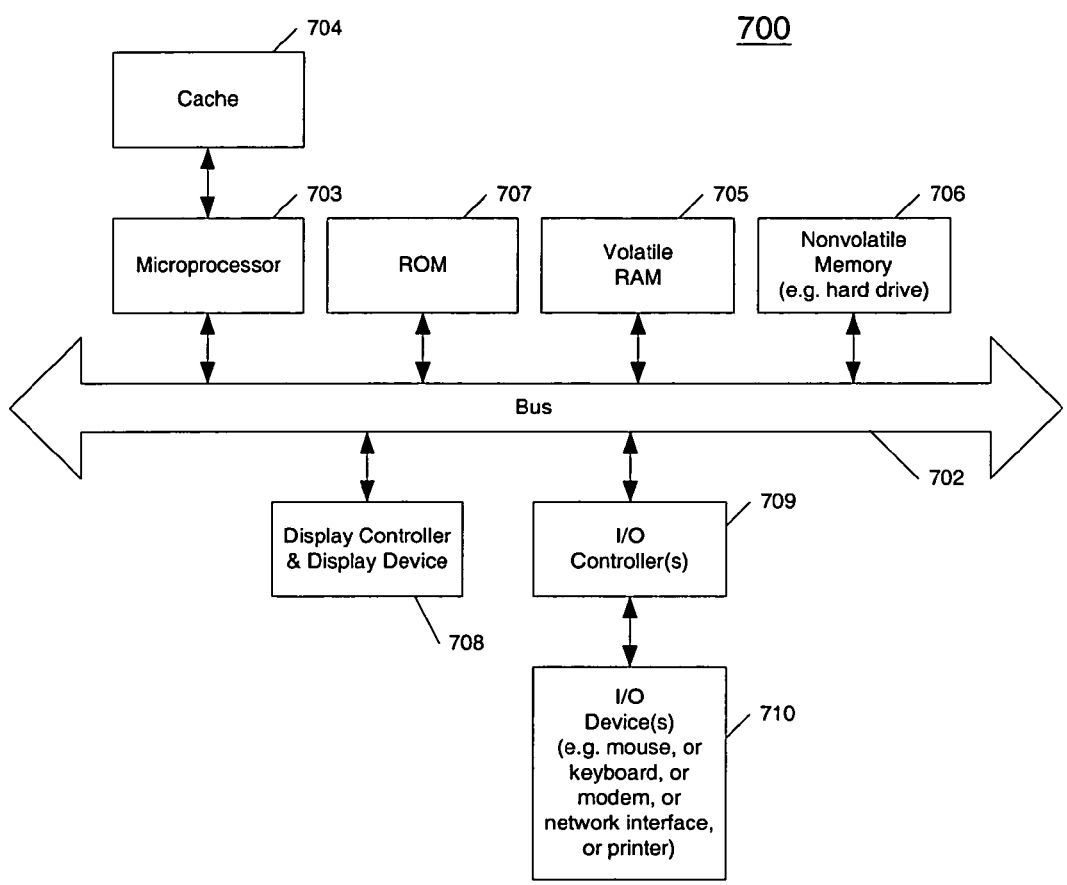
FIG. 7 is a block diagram of a data processing system which may be used to process electronic messages, in accordance with one embodiment of the invention.

FIG. 7 is a block diagram of a digital processing system which may be used with one embodiment of the invention. For example, the system 700 shown in FIG. 7 may be used as a client computer system (e.g., the client computer systems 102, 104, 118, and/or 120 of FIG. 1), a Web server system (e.g., the Web server system 128), or a conventional server system, etc. Furthermore, the digital processing system 700 may be used to perform one or more functions of an Internet service provider, such as the ISP 124 and 126.

Note that while FIG. 7 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 7 may, for example, be an Apple Macintosh computer or a IBM compatible PC.

As shown in FIG. 7, the computer system 700, which is a form of a data processing system, includes a bus 702 which is coupled to a microprocessor 703 and a ROM 707, a volatile RAM 705, and a non-volatile memory 706. The microprocessor 703, which may be, for example, a PowerPC G4 or PowerPC G5 microprocessor from Motorola, Inc. or IBM, is coupled to cache memory 704 as shown in the example of FIG. 7. The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art. Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 7 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices.

Thus, a method and apparatus for processing electronic messages have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for processing electronic messages, the method comprising:
   detecting automatically, at an email client used by a user, availability of an alternative delivery mechanism based on an alternative to standard email system protocols for an outgoing email message already addressed according to the standard email system protocols to an email address of a recipient at a remote site from the email client, the detection being transparent to the user, the outgoing email message being deliverable from the email client via a delivery mechanism based on the standard email system protocols; and
   sending automatically the outgoing email message from the email client to the recipient via the alternative delivery mechanism, if the availability of the alternative delivery mechanism is detected.

2. The method of claim 1, further comprising sending the outgoing email message to a email server which forwards the outgoing email message to the recipient, if the alternative delivery mechanism is unavailable.

3. The method of claim 1, wherein the alternative delivery mechanism is capable of directly and substantial instantly delivering the outgoing email message to the recipient and wherein the alternative delivery mechanism is capable of substantial instantly receiving a confirmation of arrival of the outgoing email message at the remote site.

4. The method of claim 1, wherein the alternative delivery mechanism is an instant messaging (IM) system.

5. The method of claim 1, wherein determining whether the alternative delivery mechanism is available comprises looking up, in a database, an alternative address of the recipient used in the alternative delivery mechanism based on the email address of the recipient.

6. The method of claim 5, wherein determining whether the alternative delivery mechanism is available further comprises determining whether the alternative delivery capability of the recipient is enabled.

7. The method of claim 6, wherein determining whether the alternative delivery mechanism is available further comprises determining whether the alternative delivery capability of the recipient is capable of receiving the outgoing email message according to a successful registration of a email client with the alternative delivery capability at the recipient.

8. The method of claim 1, further comprising converting the outgoing email message to a message in accordance with a communication protocol of the alternative delivery mechanism.

9. The method of claim 8, further comprising tagging the message with an identification indicating the message delivered by the alternative delivery mechanism is a email message.

10. The method of claim 1, further comprising substantial instantly receiving, at the email client, a confirmation of an arrival of the outgoing email message at the recipient via the alternative delivery mechanism.

11. The method of claim 1, wherein an email system corresponding to the email client operates independently with respect to the alternative delivery mechanism.

12. A method for processing electronic messages, the method comprising:
   sending an online status of an instant messaging (IM) client used by a user;
   receiving a message, subsequent to the sending of the online status, at the IM client from an originator over a network through a delivery mechanism based on an alternative to standard email system protocols, the message sent out from the originator designated to an application communicably coupled to the IM client, the message including an email message addressed according to the standard email system protocols to an email address, the email message being deliverable from the originator via a delivery mechanism based on the standard email system protocols;
   determining, at the IM client, which application the message is designated to, the determination being transparent to the user; and
   delivering the message to the designated application via an application programming interface (API).

13. The method of claim 12, further comprising presenting the message at a display of the IM client if the message is not designated to an application other than the IM client.

14. The method of claim 12, further comprising examining a signature tagged with the message to determine which application the message is designated to.

15. The method of claim 12, further comprising converting the message to a message compatible with the designated application prior to the delivering.

16. The method of claim 12, wherein the designated application is an email client, wherein the method further comprises repackaging the message as the email message, such that the message is displayed at the email client as if it is received from a corresponding email server.

17. The method of claim 12, wherein the designated application is capable of receiving data from a remote application.

18. The method of claim 17, further comprising updating the designated application based on the message delivered transparently to a user of the designated application.

19. The method of claim 12, further comprising determining whether the designated application is running.

20. The method of claim 19, wherein if the designated application is not running, the method further comprises returning an error indicating a failure of a delivery of the message.

21. The method of claim 19, wherein if the designated application is not running, the method further comprises:
  launching the designated application;
  establishing a connection between the IM client and the designated application; and
  transmitting the message to the designated application over the established connection.

22. A method for processing electronic messages, the method comprising:
  operating an application of a client used by a user, the application capable of sending out and receiving data with another application;
  determining whether the client has an instant messaging (IM) capability; and
  registering the application with the client's IM capability, such that the application is able to detect automatically availability of an alternative delivery mechanism based on an alternative to standard email system protocols to send out and receive data including an email message addressed according to the standard email system protocols to a email address, the ability to detect being transparent to the user, the email message being deliverable via a delivery mechanism based on the standard email system protocols, via the client's IM capability, with another application over a network through the alternative delivery mechanism.

23. The method of claim 22, further comprising advertising, in a community associated with the IM capability, that the client's IM capability is capable of handling data associated with the application, upon a completion of the registration.

24. The method of claim 22, further comprising:
  determining whether the client's IM capability is activated;
  activating the client's IM capability; and
  establishing a connection between the application and the IM capability.

25. The method of claim 22, wherein the application and IM capability operate independently with respect to each other.

26. The method of claim 22, wherein the application is an electronic email application.

27. A machine-readable non-transitory medium having executable code to cause a machine to perform a method for processing electronic messages, the method comprising:
  detecting automatically, at an email client, availability of an alternative delivery mechanism based on an alternative to standard email system protocols for an outgoing email message addressed according to standard email system protocols to an email address of a recipient at a remote site from the email client, the outgoing email message being deliverable from the email client via a delivery mechanism based on the standard email system protocols, the ability to detect being transparent to a user of the email client; and
  sending automatically the outgoing email message to the recipient via the alternative delivery mechanism, if the availability of the alternative delivery mechanism is detected.

28. The machine-readable non-transitory medium of claim 27, wherein the alternative delivery mechanism is an instant messaging (IM) system.

29. The machine-readable non-transitory medium of claim 27, wherein determining whether the alternative delivery mechanism is available comprises looking up, in a database, an alternative address of the recipient used in the alternative delivery mechanism based on the email address of the recipient.

30. The machine-readable non-transitory medium of claim 29, wherein determining whether the alternative delivery mechanism is available further comprises determining whether the alternative delivery capability of the recipient is enabled.

31. The machine-readable non-transitory medium of claim 30, wherein determining whether the alternative delivery mechanism is available further comprises determining whether the alternative delivery capability of the recipient is capable of receiving the outgoing email message according to a successful registration of the email client with the alternative delivery capability at the recipient.

32. The machine-readable non-transitory medium of claim 27, wherein the method further comprises converting the outgoing email message to a message in accordance with a communication protocol of the alternative delivery mechanism.

33. The machine-readable non-transitory medium of claim 32, wherein the method further comprises tagging the message with an identification indicating the message delivered by the alternative delivery mechanism is a email message.

34. An apparatus for processing electronic messages, the apparatus comprising:
  means for detecting automatically, at an email client used by a user, availability of an alternative delivery mechanism based on an alternative to standard email system protocols for an outgoing email message addressed according to standard email system protocols to a email address of a recipient at a remote site from the email client, the detection being transparent to the user, the outgoing email message being deliverable from the email client via a delivery mechanism based on the standard email system protocols; and
  means for sending automatically the outgoing email message to the recipient via the alternative delivery mechanism, if the availability of the alternative delivery mechanism is detected.

35. The apparatus of claim 34, wherein the alternative delivery mechanism is an instant messaging (IM) system.

36. The apparatus of claim 34, wherein means for determining whether the alternative delivery mechanism is available comprises means for looking up, in a database, an alternative address of the recipient used in the alternative delivery mechanism based on the email address of the recipient.

37. The apparatus of claim 36, wherein means for determining whether the alternative delivery mechanism is available further comprises means for determining whether the alternative delivery capability of the recipient is enabled.

38. The apparatus of claim 37, wherein means for determining whether the alternative delivery mechanism is available further comprises means for determining whether the alternative delivery capability of the recipient is capable of receiving the outgoing email message according to a successful registration of the email client with the alternative delivery capability at the recipient.

39. The apparatus of claim 34, wherein further comprising means for converting the outgoing email message to a message in accordance with a communication protocol of the alternative delivery mechanism.

40. The apparatus of claim 32, wherein further comprising means for tagging the message with an identification indicating the message delivered by the alternative delivery mechanism is an email message.

41. A data processing system, comprising:
  a processor; and a memory coupled to the processor to store instructions that causes the processor to perform operations of processing electronic messages, the operations including:

detecting automatically, at an email client used by a user, availability of an alternative delivery mechanism based on an alternative to standard email system protocols for an outgoing email message addressed according to standard email system protocols to an email address of a recipient at a remote site from the email client, the detection being transparent to the user, the outgoing email message being deliverable from the email client via a delivery mechanism based on the standard email system protocols; and sending automatically the outgoing email message to the recipient via the alternative delivery mechanism, if the availability of the alternative delivery mechanism is detected.

42. A machine-readable non-transitory medium having executable code to cause a machine to perform a method for processing electronic messages, the method comprising:

sending an online status of an instant messaging (IM) client used by a user;

receiving a message, subsequent to the sending of the online status, at the IM client from an originator over a network through a delivery mechanism based on an alternative to standard email system protocols, the message being sent out from the originator designated to an application communicably coupled to the IM client, the message including an email message according to the standard email system protocols to an email address, the email message being deliverable from the originator via a delivery mechanism based on the standard email system protocols;

determining, at the IM client, which application the message is designated to, the determination being transparent to the user; and delivering the message to the designated application via an application programming interface (API).

43. The machine-readable non-transitory medium of claim 42, wherein the method further comprises examining a signature tagged with the message to determine which application the message is designated to.

44. The machine-readable non-transitory medium of claim 42, wherein the method further comprises converting the message to a message compatible with the designated application prior to the delivering.

45. The machine-readable non-transitory medium of claim 42, wherein the designated application is an email client, wherein the method further comprises repackaging the message as the email message, such that the message is displayed at the email client as if it is received from a corresponding email server.

46. The machine-readable non-transitory medium of claim 42, wherein the method further comprises determining whether the designated application is running.

47. The machine-readable non-transitory medium of claim 46, wherein if the designated application is not running, the method further comprises returning an error indicating a failure of a delivery of the message.

48. The machine-readable non-transitory medium of claim 47, wherein if the designated application is not running, the method further comprises:

launching the designated application;

establishing a connection between the IM client and the designated application; and transmitting the message to the designated application over the established connection.

49. An apparatus for processing electronic messages, the apparatus comprising:

means for sending an online status of an instant messaging (IM) client used by a user;

means for receiving a message, subsequent to the sending of the online status, at the IM client from an originator over a network through a delivery mechanism based on an alternative to standard email system protocols, the message being sent out from the originator designated to an application communicably coupled to the IM client, the message including an email message addressed according to the standard email system protocols to an email address, the email message being deliverable from the originator via a delivery mechanism based on the standard email system protocols;

means for determining, at the IM client, which application the message is designated to, the determination being transparent to the user; and means for delivering the message to the designated application via an application programming interface (API).

50. The apparatus of claim 49, further comprising means for examining a signature tagged with the message to determine which application the message is designated to.

51. The apparatus of claim 42, further comprising means for converting the message to a message compatible with the designated application prior to the delivering.

52. The apparatus of claim 42, wherein the designated application is an email client, wherein the apparatus further comprises means for repackaging the message as the email message, such that the message is displayed at the email client as if it is received from a corresponding email server.

53. The apparatus of claim 42, further comprising means for determining whether the designated application is running.

54. The apparatus of claim 46, wherein if the designated application is not running, the apparatus further comprises returning an error indicating a failure of a delivery of the message.

55. The apparatus of claim 47, wherein if the designated application is not running, the apparatus further comprises:

means for launching the designated application;

means for establishing a connection between the IM client and the designated application; and means for transmitting the message to the designated application over the established connection.

56. A data processing system, comprising:

a processor; and a memory coupled to the processor to store instructions that causes the processor to perform operations of processing electronic messages, the operations including:

sending an online status of an instant messaging (IM) client used by a user;

receiving a message, subsequent to the sending of the online status, at the IM client from an originator over a network through a delivery mechanism based on an alternative to standard email system protocols, the message being sent out from the originator designated to an application communicably coupled to the IM client, the message including an email message addressed according to the standard email system protocols, the email message being deliverable from the originator via a delivery mechanism based on the standard email system protocols;

determining, at the IM client, which application the message is designated to, the determination being transparent to the user; and delivering the message to the designated application via an application programming interface (API).

57. A machine-readable non-transitory medium having executable code to cause a machine to perform a method for processing electronic messages, the method comprising:
operating an application of a client used by a user, the application capable of transmitting and receiving data with another application;
determining whether the client has an instant messaging (IM) capability; and
registering the application with the client's IM capability, such that the application is able to detect availability of an alternative delivery mechanism based on an alternative to standard email system protocols to transmit and receive data including an email message addressed according to the standard email system protocols to an email address, the ability to detect being transparent to the user, the email message being deliverable via a delivery mechanism based on the standard email system protocols, via the client's IM capability, with another application over a network through the alternative delivery mechanism.

58. The machine-readable non-transitory medium of claim 57, wherein the method further comprises advertising, in a community associated with the IM capability, that the client's IM capability is capable of handling data associated with the application, upon a completion of the registration.

59. The machine-readable non-transitory medium of claim 57, wherein the method further comprises
determining whether the client's IM capability is activated;
activating the client's IM capability; and
establishing a connection between the application and the IM capability.

60. The machine-readable non-transitory medium of claim 57, wherein the application is an electronic email application.

61. An apparatus for processing electronic messages, the apparatus comprising:
means for operating an application of a client used by a user, the application capable of transmitting and receiving data with another application;
means for determining whether the client has an instant messaging (IM) capability; and
means for registering the application with the client's IM capability, such that the application is able to detect availability of an alternative delivery mechanism based on an alternative to standard email system protocols to send out and receive data including an email message addressed to an email address according to the standard email system protocols, the ability to detect being transparent to the user, the email message being deliverable via a delivery mechanism based on the standard email system protocols, via the client's IM capability, with another application over a network through the alternative delivery mechanism.

62. The apparatus of claim 61, wherein further comprising means for advertising, in a community associated with the IM capability, that the client's IM capability is capable of handling data associated with the application, upon a completion of the registration.

63. The apparatus of claim 61, further comprising:
means for determining whether the client's IM capability is activated;
means for activating the client's IM capability; and
means for establishing a connection between the application and the IM capability.

64. The apparatus of claim 61, wherein the application is an electronic email application.

65. A data processing system, comprising:
a processor; and
a memory coupled to the processor to store instructions that causes the processor to perform operations of processing electronic messages, the operations including:
operating an application of a client used by a user, the application capable of transmitting and receiving data with another application;
determining whether the client has an instant messaging (IM) capability; and
registering the application with the client's IM capability, such that the application is able to detect availability of an alternative delivery mechanism based on an alternative to standard email system protocols to send out and receive data including an email message addressed according to the standard email system protocols to an email address, the ability to detect being transparent to the user, the email message being deliverable via a delivery mechanism based on the standard email system protocols, via the client's IM capability, with another application over a network through the alternative delivery mechanism.

66. A method for processing electronic messages, the method comprising:
detecting automatically, at a email client used by a user, availability of an alternative delivery mechanism based on an alternative to standard email system protocols for an outgoing email message already addressed according to the standard email system protocols to an email address of a recipient at a remote site from the email client, the outgoing email message being deliverable from the email client via a delivery mechanism based on the standard email system protocols, the detection being transparent to the user;
identifying the alternative delivery mechanism from the one or more alternative delivery mechanisms if the availability is detected, the alternative delivery mechanism being most appropriate for delivering the outgoing email message; and
sending automatically the outgoing email message to the recipient via the identified alternative delivery mechanism.

67. The method of claim 66, wherein the identifying the alternative mechanism comprises selecting the alternative delivery mechanism that can transport the outgoing email message in one of a fastest manner and a secure manner.

68. The method of claim 66, wherein the identifying the alternative mechanism comprises determining whether the alternative mechanism of the recipient is enabled.

69. The method of claim 66, wherein the alternative delivery mechanism is an instant messaging (IM) system.

70. A machine-readable non-transitory medium having executable code to cause a machine to perform a method for processing electronic messages, the method comprising:
detecting automatically, at an email client used by a user, availability of an alternative delivery mechanism based on an alternative to standard email system protocols for an outgoing email message addressed according to the standard email system protocols to a email address of a recipient at a remote site from the email client, the outgoing email message being deliverable from the email client via a delivery mechanism based on the standard email system protocols, the detection being transparent to the user;
identifying the alternative delivery mechanism from the one or more alternative delivery mechanisms if the availability is detected, the alternative delivery mechanism being most appropriate for delivering the outgoing email message; and sending automatically the outgoing email message to the recipient via the identified alternative delivery mechanism.

71. The machine-readable non-transitory medium of claim 70, wherein the identifying the alternative mechanism comprises selecting the alternative delivery mechanism that can transport the outgoing email message in one of a fastest manner and a secure manner.

72. The machine-readable non-transitory medium of claim 70, wherein the identifying the alternative mechanism comprises determining whether the alternative mechanism of the recipient is enabled.

73. The machine-readable non-transitory medium of claim 70, wherein the alternative delivery mechanism is an instant messaging (IM) system.

74. An apparatus for processing electronic messages, the apparatus comprising:
means for detecting automatically, at an email client used by a user, availability of an alternative delivery mechanism based on an alternative to standard email system protocols for a outgoing email message addressed according to the standard email system protocols to an email address of a recipient at a remote site from the email client, the outgoing email message being deliverable from the email client via a delivery mechanism based on the standard email system protocols, the detection being transparent to the user;
means for identifying the alternative delivery mechanism from the one or more alternative delivery mechanisms if the availability is detected, the alternative delivery mechanism being most appropriate for delivering the outgoing email message; and
means for sending automatically the outgoing email message to the recipient via the identified alternative delivery mechanism.

75. The apparatus of claim 74, wherein means for identifying the alternative mechanism comprises means for selecting the alternative delivery mechanism that can transport the outgoing email message in one of a fastest manner and a secure manner.

76. The apparatus of claim 74, wherein means for identifying the alternative mechanism comprises means for determining whether the alternative mechanism of the recipient is enabled.

77. The apparatus of claim 74, wherein the alternative delivery mechanism is an instant messaging (IM) system.

78. A data processing system, comprising:
a processor; and
a memory coupled to the processor to store instructions that causes the processor to perform operations of processing electronic messages, the operations including:
detecting automatically, at an email client used by a user, availability of an alternative delivery mechanism based on an alternative to standard email system protocols, for an outgoing email message already addressed according to the standard email system protocols to an email address of a recipient at a remote site from the email client, the detection being transparent to the user, the outgoing email message being deliverable from the email client via a delivery mechanism based on the standard email system protocols;
identifying the alternative delivery mechanism from the one or more alternative delivery mechanisms if the availability is detected, the alternative delivery mechanism being most appropriate for delivering the outgoing email message, the alternative delivery mechanism being based on an alternative to the standard email system protocols; and
sending automatically the outgoing email message to the recipient via the identified alternative delivery mechanism.

79. An apparatus for processing electronic email messages, the apparatus comprising:
an email processing module to prepare an outgoing email message for a user addressed according to standard email system protocols to a recipient of a remote site from the email processing module, the email processing module being capable of sending the outgoing email message for a user to the recipient via an email server via a delivery mechanism based on the standard email system protocols; and
at least one alternative message delivery mechanism communicatively coupled to the email processing module, the at least one alternative delivery mechanism being based on an alternative to the standard email system protocols, wherein the email processing module automatically detects availability of one of the at least one alternative message delivery mechanism that is able to send the outgoing email message to the recipient, the detection being transparent to the user, wherein the email processing module selects the one of the at least one alternative message delivery mechanism if the availability is detected, and
wherein the email processing module automatically transmits the outgoing email message to the selected alternative message delivery mechanism to send the outgoing email message to the recipient via a communication mechanism associated with the selected alternative message delivery mechanism.

80. The apparatus of claim 79, wherein the email processing module communicates with the at least one alternative message delivery mechanism to determine whether one of the at least one alternative message delivery mechanism is available to send the outgoing email message to the recipient in a more appropriate manner before transmitting the outgoing email message to the at least one alternative message delivery mechanism.

81. The apparatus of claim 79, wherein the at least one alternative message delivery mechanism includes an instant messaging system.

82. The apparatus of claim 79, wherein the email processing module performs a lookup operation in a database to determine an alternative address of the recipient used in the alternative message delivery mechanism based on the email address of the recipient.

83. The apparatus of claim 82, wherein the email processing module determines, via the at least one alternative message delivery mechanism, whether a respective alternative message delivery mechanism of the recipient is enabled before transmitting the outgoing email message to the selected alternative message delivery mechanism.

84. The apparatus of claim 83, wherein the email processing module further determines, via the at least one alternative message delivery mechanism, whether a respective alternative message delivery mechanism of the recipient is capable of forwarding the outgoing email message to a respective email processing module of the recipient according to a successful registration with the respective alternative message delivery mechanism at the recipient.

85. An apparatus for processing electronic email messages, the apparatus comprising:
- an email processing module capable of receiving an email message addressed according to standard email system protocols to an email address from a sender via an email server through a delivery mechanism based on the standard email system protocols; and
- at least one alternative message delivery mechanism communicatively coupled to the email processing module from the sender, the at least one alternative delivery mechanism being based on an alternative to the standard email system protocols,
- wherein the at least one alternative message delivery mechanism sends an online status to receive and forward an incoming message sent out from the sender to the email processing module if the incoming message is an email message, the incoming message being received via a communication mechanism associated with the at least one alternative message delivery mechanism.

86. The apparatus of claim 85, wherein the at least one alternative message delivery mechanism includes an instant messaging system.

87. The apparatus of claim 85, wherein the at least one alternative message delivery mechanism determines whether the incoming message is an email message by examining an identification tagged with the incoming message.

88. The apparatus of claim 87, wherein if the incoming message is not an email message, the at least one alternative message delivery mechanism forwards the message to an associated user interface.

89. A method for processing electronic messages at a server, the method comprising:
- receiving a message from a first messaging client of a first user, the message being sent out from a first email client of the first user communicatively coupled to the first messaging client, the message including an email message addressed according to standard email system protocols to an email address, the email message being deliverable from the first messaging client via a delivery mechanism based on standard email system protocols;
- detecting availability of an alternative delivery mechanism based on an alternative to the standard email system protocols;
- substantially instantly sending out the message to a second messaging client of a second user via the alternative delivery mechanism if the availability is detected, the second messaging client being communicatively coupled to a second email client of the second user,
- wherein the detection being transparent to the first user and the second user, and
- wherein the message is forwarded to the second email client from the second messaging client and the second email client processes the message as an ordinary email message that would have been received from the first email client of the first user via an email server via the delivery mechanism.

90. The method of claim 89, wherein the message is an instant message and the server is an instant messaging server.

* * * * *

UNITED STATES PATENT AND TRADEMARK OFFICE
CERTIFICATE OF CORRECTION

| | | |
|---|---|---|
| PATENT NO. | : 7,765,263 B1 | Page 1 of 1 |
| APPLICATION NO. | : 10/741948 | |
| DATED | : July 27, 2010 | |
| INVENTOR(S) | : Jens Peter Alfke | |

It is certified that error appears in the above-identified patent and that said Letters Patent is hereby corrected as shown below:

On Title page 2, Item (56) in column 1, under "Other Publications", line 3, delete "Nationswide." and insert -- Nationwide. --, therefor.

On Title page 2, Item (56) in column 1, under "Other Publications", line 5, delete "SIGGSROUP" and insert -- SIGGROUP --, therefor.

In column 15, line 39, delete "counter part" and insert -- counterpart --, therefor.

Signed and Sealed this
Eighth Day of November, 2011

David J. Kappos
*Director of the United States Patent and Trademark Office*